April 29, 1958     E. K. GARDNER     2,832,185
LIFTING AND FLUFFING MEANS FOR COTTON HARVESTERS
Filed May 27, 1953
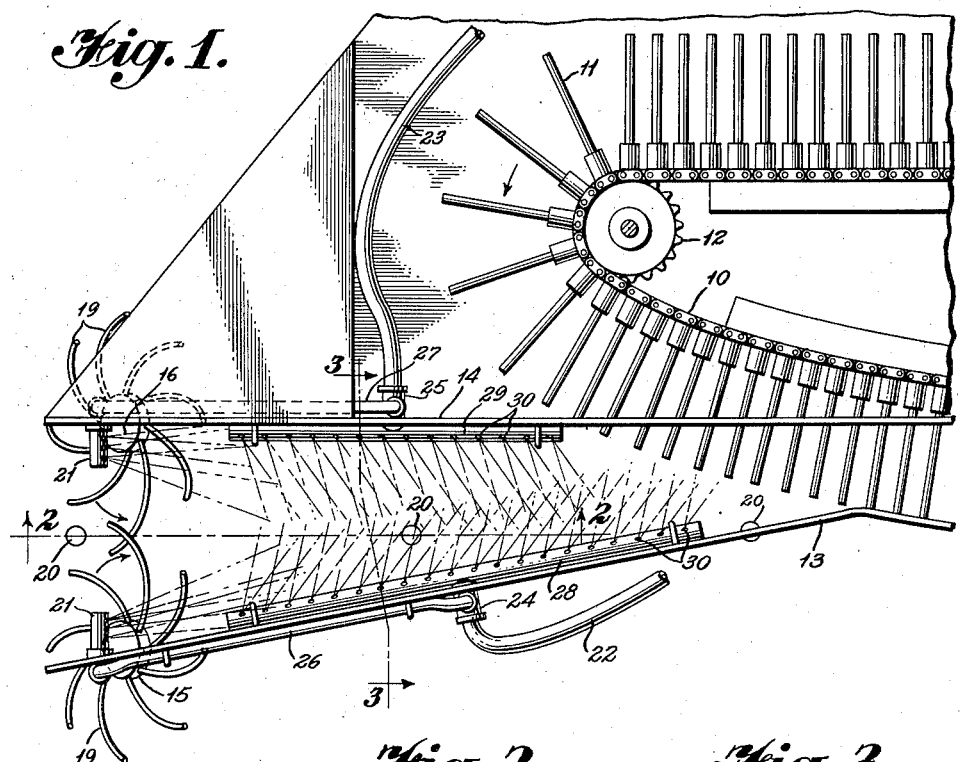
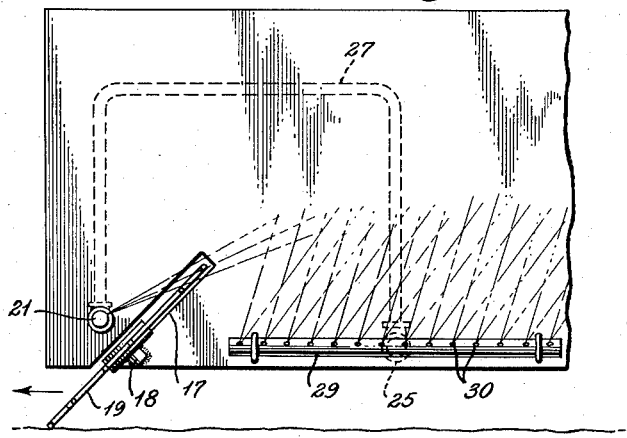
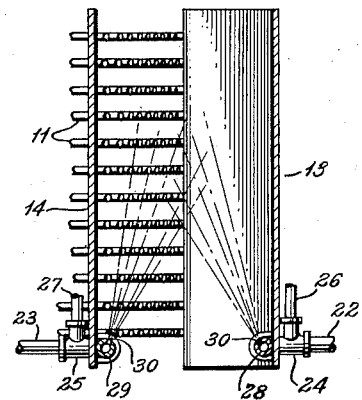
INVENTOR
*Eris K. Gardner*
BY *Stevens, Davis, Miller & Mosher*
ATTORNEYS United States Patent Office 2,832,185
Patented Apr. 29, 1958

2,832,185
LIFTING AND FLUFFING MEANS FOR COTTON HARVESTERS

Eris K. Gardner, Gilbert, La.

Application May 27, 1953, Serial No. 357,823

5 Claims. (Cl. 56—28)

The present invention relates to improvements in cotton picking machines and more particularly to improvements in cotton picking machines of the type described in Rust Reissue Patent No. 19,411, reissued January 1, 1935, for the purpose of improving and rendering more efficient machines of this type.

The machine described in the reissue patent, above identified, has an endless spindle carrying belt mounted on an outwardly curved track on the picking side of the machine to cause the spindles to enter and leave the plants being picked gradually. The belt is timed with respect to the row of plants to move the spindles backwardly at approximately the same speed as the machine is being moved forwardly. This arrangement has the effect of a large spindle carrying drum acting on the row, but in reality is more nearly in the nature of a segment of a large drum, thus enabling the machine to be constructed narrow enough to pass between the rows of cotton plants and at the same time allowing the spindles to remain a comparatively long time in the plants for efficiently gathering the cotton from the plants without injury to them. The machine is further provided with a tunnel like structure through which the cotton plants pass and into which the spindles are projected. One side of the tunnel serves to restrain the cotton plants from following the spindles around as they are moved by the belt toward the side of the machine where they are doffed or stripped of the gathered cotton.

This type of a cotton picking or gathering machine has been found to operate satisfactory and gathers about 75% or more of the cotton on the plants. The machine does not, however, successfully gather cotton from the lowermost branches of the cotton plant, or those branches of the cotton plant which have been bent downwardly and are partially covered with earth.

It is, accordingly, an object of the present invention to provide improvements in a cotton picking machine, of the type above described, which will cooperate to lift the cotton bolls located on the lower most branches of the cotton plant to a level where they can be effectively picked by the machine.

It is a further object of the present invention to provide improvements in a cotton picking machine, of the type above described, which will enable the machine to operate more efficiently, effectively and economically than has heretofore been possible.

Other and further objects of the present invention will become readily apparent from a detailed consideration of the following description when taken in conjunction with the drawings in which:

Figure 1 is a view in plan with parts broken away and shown in section showing the improvements of the present invention;

Figure 2 is a view in elevation along line 2—2 of Figure 1 looking at one side of the tunnel; and Figure 3 is a view in vertical section taken along line 3—3 of Figure 1.

Referring now to the drawings, it will be noted that there is shown only a portion of a cotton picking machine of the type referred to above. This machine consists in part of an endless spindle carrying belt 10 arranged with a plurality of revolving smooth spindles 11. The spindles 11 are mounted in both horizontal and vertical rows. The belt 10 is driven through a sprocket wheel 12 by suitable means and travels in the direction indicated by the arrow. The forward end of the machine is fashioned into a tunnel-like structure through which the cotton plants to be picked are guided to the spindles. Suitable provision is made to allow spindles 11 to project into the tunnel. This tunnel-like structure is composed of two sheet metal shields 13 and 14. The forward end of the tunnel is flared outwardly to form a mouth that will act to funnel plants into the machine. It will be appreciated that only the structure requisite to an understanding of the present invention, is being described. A complete description of the cotton picking machine will be found in the Reissue Patent No. 19,411.

The improvements of the present invention consists in a pair of freely rotatable wheels 15 and 16 mounted at a slant or acute angle to the ground in the shield plates 13 and 14 at their forward ends with the lower sides of the wheels pointing forwardly. For this purpose, the shield plates are suitably slotted at an angle, as indicated by the numeral 17 in Figure 2. The wheels 15 and 16 are mounted in the slots 17 of the shields by means of a journal 18 fixed in the respective shield plate. The mountings of the wheels 15 and 16 on the journals 18 may be by any suitable means provided the wheels will be freely rotatable. Projecting radially from each of the wheels 15 and 16 are a plurality of curved fingers 19 which over-lap in the tunnel. By means of this arrangement, as the machine moves forwardly, cotton stalks, indicated by the numeral 20 in Figure 1, will engage the curved fingers 19 of the two wheels causing them to move in the directions indicated by the arrows until the stalk 20 has moved to a position behind the two wheels where it will clear fingers 19. At this time the next succeeding set of fingers 19 has moved into position to be acted on by the next succeeding stalk. Thus, a turnstile effect is produced. As the two wheels 15 and 16 and their corresponding fingers 19 are mounted at an angle to the horizontal to incline upwardly in the direction of apparent movement of the stalks 20, the rotation of the wheels and fingers result in the fingers 19 lifting the lowermost branches on the cotton stalks to a level where they can be efficiently acted on by the spindles 11. Since the fingers 19 are spaced, earth and rocks which cover any branches can fall during elevation of the branches and there is no danger of harming the spindles.

To assist in lifting the lowermost branches, air jets 21 are arranged on either side of the tunnel to blow air upwardly and inwardly into the tunnel. This has the effect of cleaning the cotton bolls and also fluffing them preparatory to picking in the event the bolls are damp. Air is supplied through tubes 22 and 23 to T's 24 and 25, respectively from a suitable source such as a tank mounted on the machine. A tube 26 connects T 24 with the air jet assembly located on one side of the tunnel and a tube 27 connects T 25 with the air jet assembly located on the other side of the tunnel. The T's 24 and 25 are also connected to manifolds 28 and 29, respectively. Each of these manifolds is provided with a plurality of jets 30 which are directed upwardly and transversely inwardly into the tunnel in a manner that the air streams, issuing from jets on opposite sides of the tunnel, will intersect at a point approximately midway between the two sides of the tunnel. The purpose and function of the jets 30 is to maintain the lowermost branches of the stalks 20 together with the cotton bolls thereon at their elevated position during the short space of travel between the fingers 19 and the spindles 11 so that when the stalks 20 arrive at the spindles 11 all branches of the stalk will be in a position to be efficiently acted on by the picking machine and the spindles 11 will be able to gather substantially 100% of the available cotton.

Although the distance between the wheels 15 and 16 and the spindles 11 has been shown to be great, it will be appreciated that this is an exaggeration which has been done merely for the purpose of clearly demonstrating the invention. Actually the wheels 15 and 16 are arranged to just clear the spindles in a manner that the performance of the wheels 15 and 16 will not interfere with the performance of the spindles. Hence, as the distance is in reality extremely short, a shorter manifold is used than the one shown.

While this invention has been shown and described in a single embodiment, nevertheless various changes and modifications obvious to one skilled in the art are within the spirit, scope and contemplation of the present invention.

What is claimed is:

1. In a cotton picking machine having a picking mechanism the improvement that comprises means mounted on the forward end of said machine to lift the lowermost branches of the cotton plants to be picked to a level where they can be effectively picked and a unitary means cooperating with said first mentioned means, said unitary means defining an air jet mounted to clean and fluff the cotton bolls on the branches as well as hold them in their lifted position.

2. In a cotton picking machine having a picking means, the improvement that comprises a wheel having radial fingers freely mounted for rotation on the forward end of said machine, means defining an air jet located in proximity to said wheel and directed upwardly and inwardly toward the picking means of said machine, said wheel being mounted on an incline so that stalks of cotton plants will engage said radial fingers causing rotation of said wheel whereby, said fingers will act to lift the lowercost branches of the stalks to a level where they can be effectively picked.

3. In a cotton picking machine having a picking means, the improvement that comprises a wheel having radial fingers freely mounted for rotation on the forward end of said machine, means defining an air jet located between said wheel and the picking means of said machine and directed upwardly and transversely to the forward movement of said machine, said wheel being mounted on an incline so that stalks of cotton plants will engage said radial fingers causing rotation of said wheel whereby, said fingers will act to lift the lowermost branches of the stalks to a level where they can be effectively picked.

4. In a cotton picking machine having a picking means, the improvement that comprises a pair of wheels freely mounted for rotation on the forward end of said machine, means defining an air jet located adjacent each of said wheels and directed upwardly and inwardly towards the picking means of said machine, each of said wheels having radial fingers, said wheels being arranged with the fingers of one overlapping the fingers of the other, said wheels being mounted on an incline so that stalks of cotton plants engaging said fingers will cause rotation of said wheels whereby said fingers will act to lift the lowermost branches of the stalks to a level where they can be effectively picked.

5. In a cotton picking machine having a picking means, the improvement that comprises a pair of wheels freely mounted for rotation on the forward end of said machine, means defining an air jet located between said wheel and the picking means of said machine and directed upwardly and transversely to the forward movement of said machine, each of said wheels having radial fingers said wheels being arranged with the fingers of one overlapping the fingers of the other, said wheels being mounted on an incline so that stalks of cotton plants engaging said fingers will cause rotation of said wheels whereby said fingers will act to lift the lowermost branches of the stalk to a level where they can be effectively picked.

References Cited in the file of this patent

UNITED STATES PATENTS

| | | |
|---|---|---|
| 409,751 | Mathewson | Aug. 17, 1889 |
| 1,311,297 | Strong | July 29, 1919 |
| 1,926,338 | Johnston | Sept. 12, 1933 |
| 2,564,319 | Beck | Aug. 14, 1951 |
| 2,576,567 | Brown | Nov. 27, 1951 |
| 2,634,569 | Raney et al. | Apr. 14, 1953 |
| 2,652,676 | Rust | Sept. 22, 1953 |
| 2,657,515 | Rust | Nov. 3, 1953 |
| 2,663,983 | Fergason | Dec. 29, 1953 |